(12) United States Patent
Fragraklett et al.

(10) Patent No.: US 9,587,360 B2
(45) Date of Patent: Mar. 7, 2017

(54) DEVICE AND A METHOD FOR REMOVING A LIQUID FROM A WATER SURFACE

(75) Inventors: Jóhann Fragraklett, Faroe Islands (DK); Grettir Hammer, Faroe Islands (DK)

(73) Assignee: Green IQ, Faroe Islands (DK)

( * ) Notice: Subject to any disclaimer, the term of this patent is extended or adjusted under 35 U.S.C. 154(b) by 322 days.

(21) Appl. No.: 13/806,429

(22) PCT Filed: Jun. 24, 2011

(86) PCT No.: PCT/DK2011/050236
§ 371 (c)(1),
(2), (4) Date: Feb. 26, 2013

(87) PCT Pub. No.: WO2011/160645
PCT Pub. Date: Dec. 29, 2011

(65) Prior Publication Data
US 2013/0153513 A1 Jun. 20, 2013

(30) Foreign Application Priority Data
Jun. 25, 2010 (DK) .................................. 2010 70292

(51) Int. Cl.
*E02B 15/10* (2006.01)
*B01D 17/02* (2006.01)
*C02F 1/40* (2006.01)

(52) U.S. Cl.
CPC .......... *E02B 15/10* (2013.01); *B01D 17/0214* (2013.01); *C02F 1/40* (2013.01); *E02B 15/106* (2013.01)

(58) Field of Classification Search
CPC ... E02B 15/10; E02B 15/106; B01D 17/0214; C02F 1/40; C02F 2103/007
(Continued)

(56) References Cited

U.S. PATENT DOCUMENTS 1,107,391 A * 8/1914 Welch .......................... 210/242.3
1,457,637 A * 6/1923 Sievers .......................... 210/122
(Continued)

FOREIGN PATENT DOCUMENTS

DE 8314215 10/1983
DE 8314215 U1 10/1983
(Continued)

OTHER PUBLICATIONS

International Search Report (PCT/ISA/210) for International Application No. PCT/DK2011/050236 dated Oct. 20, 2011.
(Continued)

*Primary Examiner* — Christopher Upton
(74) *Attorney, Agent, or Firm* — Harness, Dickey & Pierce, P.L.C.

(57) ABSTRACT

The present invention relates in a first aspect to a liquid removal device, and in a second aspect to a method for removing a liquid, such as oil or an algae slurry, from a surface of water. The device comprises a circumferentially extending flexible wall element defining together with a bottom part a suction chamber for receiving the liquid. A floater body is sealingly connected to the flexible wall element at an upper edge of the latter, and is able to effectuate a movement in a direction that is substantially perpendicular to the surface of water. The floater body has a circumferentially extending outer member and an inner member. The inner member is adapted to receive a buoyant force exerted by the liquid contained in the suction chamber. The outer member has an upper circumferential edge for receiving the liquid.

29 Claims, 7 Drawing Sheets

(58) Field of Classification Search
USPC .......... 210/747.6, 776, 122, 170.05, 170.11, 210/242.3, 540, 923

See application file for complete search history.

(56) References Cited

U.S. PATENT DOCUMENTS

| | | | |
|---|---|---|---|
| 3,395,803 A | | 8/1968 | Sumimoto et al. |
| 3,633,749 A | * | 1/1972 | Panosh ................ 210/923 |
| 3,782,553 A | * | 1/1974 | Brekke ................ 210/242.3 |
| 3,912,635 A | * | 10/1975 | Degobert et al. ........ 210/242.1 |
| 3,983,034 A | * | 9/1976 | Wilson ................ 210/776 |
| 4,146,482 A | * | 3/1979 | Shyu ................ 210/242.3 |
| 5,059,312 A | * | 10/1991 | Galletti ................ 210/122 |
| 5,693,218 A | | 12/1997 | Yamamoto et al. |
| 6,159,362 A | | 12/2000 | Gilmore |
| 6,905,611 B2 | | 6/2005 | Gustafsson |
| 2009/0230041 A1 | * | 9/2009 | Sun et al. ............ 210/170.05 |

FOREIGN PATENT DOCUMENTS

| | | |
|---|---|---|
| DE | 9101241 U1 | 5/1991 |
| DE | 9101241 | 6/1991 |
| FR | 2238360 | 6/1973 |
| GB | 983060 | 10/1963 |
| GB | 2268091 A | 1/1994 |
| JP | 07-026538 | 1/1995 |
| SE | 23620 | 3/1906 |
| SU | 983183 | 12/1982 |
| WO | WO-9730821 A1 | 8/1997 |
| WO | WO 03/016223 | 2/2003 |

OTHER PUBLICATIONS

Written Opinion of the International Searching Authority (PCT/ISA/237) for International Application No. PCT/DK2011/050236 dated Oct. 20, 2011.

* cited by examiner

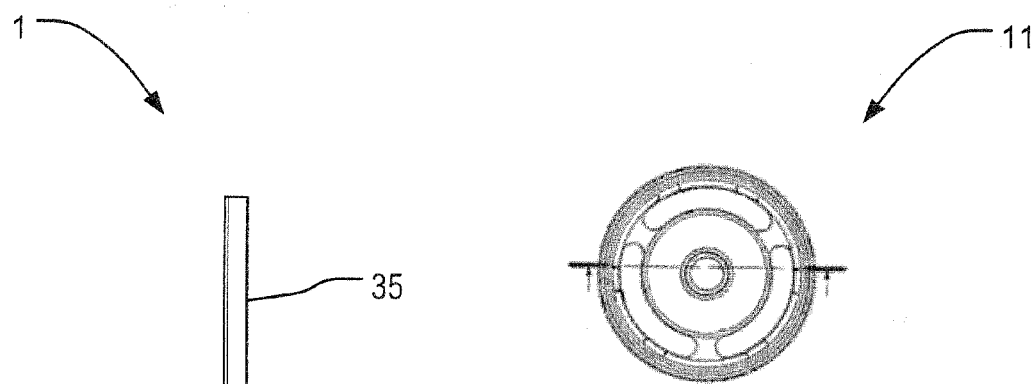
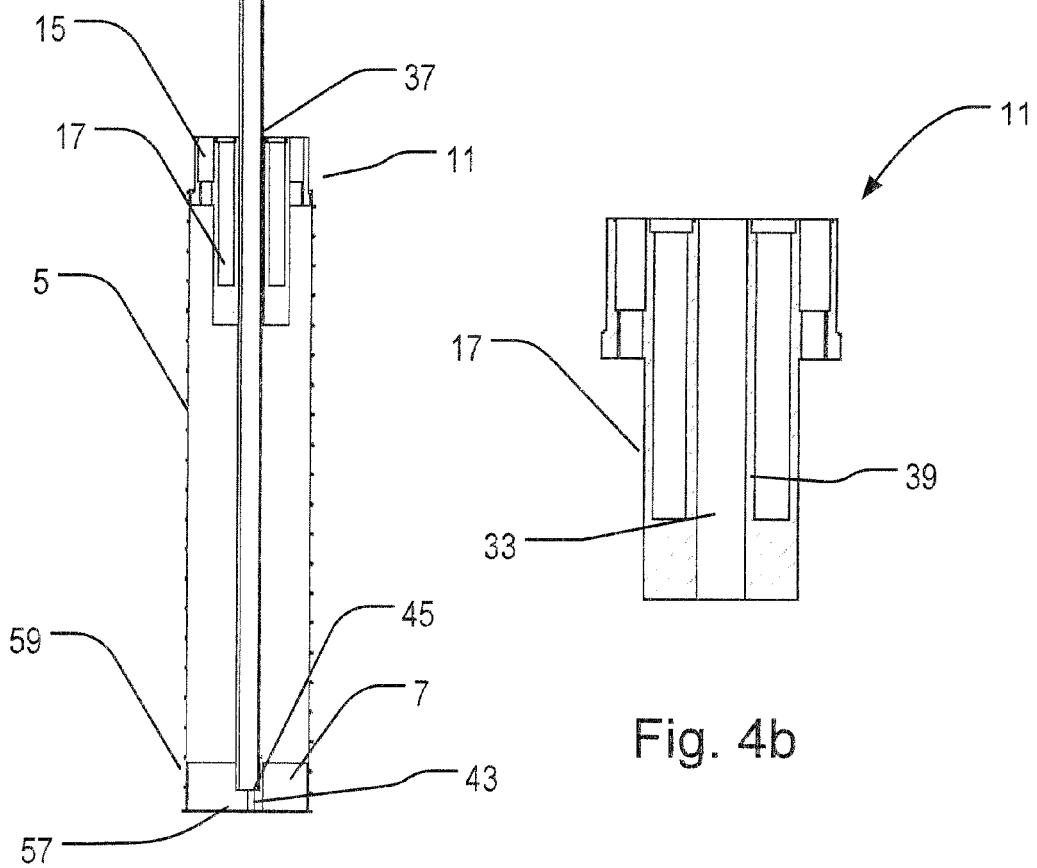
Fig. 4a
Fig. 4b
Fig. 3

DEVICE AND A METHOD FOR REMOVING A LIQUID FROM A WATER SURFACE

FIELD OF THE INVENTION

The present invention generally relates to a liquid removal device for removing a liquid from a surface of water.

BACKGROUND OF THE INVENTION

Bilge oil is an omnibus term for oil that is normally collected at the bottom of the hull of the ship in the so called bilge tank. Bilge oil may originate from oil leakage in the transmission and/or in the main seals of the engine. In addition, volumes of water, typically containing different kinds of detergents, generated during the normal operation of the ship in, for instance, the engine room are likewise collected in the bilge tank. In ships that are not provided with a bilge tank, bilge water and oil that are to be transferred to the separator are preferably collected in a keel section of the ship and/or in a bilge well. Said liquids may also frequently be observed in the engine room of the ship. Bilge oil, having lower density than bilge water containing detergents, floats on the bilge water surface. A bilge water separator, standard feature on most ships having gross tonnage that exceeds 400 tons, is normally used to separate the oil from the water. A pump and a thereto connected suction hose, whose open end is positioned at the bottom of the bilge tank, are normally used to transfer the content of the tank into the separator. Accordingly, the bilge water needs to first be removed from the bilge tank, and only thereafter may the bilge oil be removed therefrom. As a consequence, harmful oil may very frequently be observed in the bilge tank since water is continuously flowing into the tank and the above-mentioned pump has limited capacity.

Admittedly, certain of the above-mentioned detergents are capable of binding to the oil molecules, whereupon this new compound sinks to the bottom of the bilge tank for a subsequent evacuation into the separator. A portion of the oil from the water surface is hereby removed, but the method is rather expensive and environment-unfriendly since it requires significant amounts of detergent. Furthermore, said separator is rather inefficient, when large amounts of detergents are mixed with the water and/or oil.

Accordingly, current solutions for bilge water management are ridden with significant drawbacks.

U.S. Pat. No. 6,905,611 discloses a device for separating a surface layer of a liquid by a container submerged in the liquid. The container includes a bottom, a wall member, connected to the bottom and having a variable length, and a separating member, which is connected to the wall member and communicates with a space in the container via an opening. An overflow portion of the separating member is located below a free liquid surface of the surface layer. A discharge conduit extends from the space for liquid discharge. The device further comprises a floating and a submerging member that contribute to proper positioning of the overflow portion of the device relative to the liquid surface.

However, the design, as disclosed in U.S. Pat. No. 6,905,611, comprising the floating and the submerging member, renders the device bulky, deteriorating as a result its performance in narrow spaces, such as tanks found onboard ships. Moreover, when the liquid to be removed passes said overflow portion on its way into the container, the entire device is effectively submerged. As a consequence, the separating process cannot be efficiently controlled, especially on a wavy liquid surface, where occasionally only a section of the overflow portion of the device is submerged. For the same reason, the device is not suitable for removing thin layers of liquid.

In addition, the overflow portion, that is necessary for proper functioning of the device and is a structurally integrated part of the floating member, exposes the latter, and thus the entire device, to the buoyant force of the liquid held in the tank. This calls for a counterbalancing force having opposite direction in order to properly position the device relative to the surface of the liquid. Said counterbalancing force is achieved by means of the submerging member. Forces thus exerted on the device increase its operative complexity.

Moreover, the highly probable entrapment of at least a portion of the skimmed liquid by other components of the device, such as on top of the separating member, deteriorates its performance and increases its maintenance frequency.

SUMMARY OF THE INVENTION

The present invention therefore aims at providing a device and a method for removing a surface layer of liquid from water surface in spatially limited marine conditions, said device providing improved control of the liquid removal process, while reducing a number of components used.

In view of at least this object, the device is characterized by a liquid removal device including a circumferentially extending flexible wall element, a floater body and a liquid outlet.

The term "transverse measurement" refers to the distance between opposite points on a contour of the wall element on a cross section being parallel to the surface of water, such as for instance the diameter in case of a substantially circular cross sectional shape, or the width in case of a substantially square cross sectional shape of the wall element.

Liquid present in the suction chamber of the device exerts a variable buoyant force on the therein immersed floater body, thus enabling it to effectuate a movement that is substantially perpendicular to the surface of said liquid. The floater body being sealingly connected to the flexible wall element at an upper edge of the latter causes the flexible wall element to extend or contract, respectively, depending on the liquid level in the suction chamber.

The difference in length of the flexible wall element between its fully extended and fully contracted state, respectively, enables the floater body to be lifted, due to the buoyancy force coming from the liquid present in the suction chamber, above the surface of the surrounding water, into which the device is at least partially submerged.

This is particularly useful when the device is used in marine conditions, such as to remove bilge oil from a bilge water tank, oil pollution from the sea or algae slurry from a lake. When removing liquid from a still surface of water, the floater body is aimed at being kept near the border between its active and inactive position most of the time in order to obtain an efficient removal of the liquid. However, in case of fluctuations of the surface of the surrounding water, for instance during rough sea or like conditions, it is beneficial that the floater body is able to be lifted out of the surrounding water. Thereby, flooding of the floater body is avoided, and only wave crests tall enough to pass the circumferential edge of the outer element of the floater body will enter the suction chamber. Hereby, the device's intake of water in proportion to the liquid is reduced, and an efficient removal of liquid, also during rough sea or like conditions, is enabled, while an improved control of the liquid removal process from a water surface is obtained.

In another embodiment, the difference in length of the flexible wall element in a fully extended state and in a fully contracted state, respectively, is at least 4 times any transverse measurement of the flexible wall element. In yet another embodiment, the difference in length of the flexible wall element in a fully extended state and in a fully contracted state, respectively, is at least 6 times any transverse measurement of the flexible wall element, and in yet another embodiment, the difference in length of the flexible wall element in a fully extended state and in a fully contracted state, respectively, is at least 8 times any transverse measurement of the flexible wall element. Embodiments where the difference in length of the flexible wall element in a fully extended state and in a fully contracted state, respectively, is at least 3, 5 or 7 times any transverse measurement of the flexible wall element are also conceivable.

According to an embodiment of the device, the length of the flexible wall element in its fully contracted state is at least as large as any transverse measurement of the flexible wall element. This provides for a large capacity suction chamber, even when the flexible wall element is in its fully contracted state, and, at the same time, due to its relatively small transverse dimensions, a device that is suitable for use in narrow spaces, such as for instance in a bilge water tank onboard a ship.

According to another embodiment of the device, the length of the flexible wall element in its fully contracted state is at least 2 times any transverse measurement of the flexible wall element. In yet another embodiment the length of the flexible wall element in its fully contracted state is at least 3 times any transverse measurement of the flexible wall element, and in yet another embodiment, the length of the flexible wall element in its fully contracted state is at least 4 times any transverse measurement of the flexible wall element. Embodiments where the length of the flexible wall element in its fully contracted state is even larger are conceivable.

According to an embodiment of the device, the difference in length of the flexible wall element in a fully extended state and in a fully contracted state, respectively, is at least 2 times the length of the flexible wall element in its fully contracted state. This is advantageous for the same reasons as discussed above.

According to another embodiment of the device, the difference in length of the flexible wall element in a fully extended state and in a fully contracted state, respectively, is at least 3 times the length of the flexible wall element in its fully contracted state, and in yet another embodiment of the device, the difference in length of the flexible wall element in a fully extended state and in a fully contracted state, respectively, is at least 4 times the length of the flexible wall element in its fully contracted state. Embodiments wherein the difference in length of the flexible wall element in a fully extended state and in a fully contracted state, respectively, is even larger, such as for instance at least 5 or 6 times the length of the flexible wall element in its fully contracted state, are also conceivable.

In an embodiment, the outer member, in or at its upper circumferential edge, has at least one indentation or opening for receiving said liquid, a lower edge of said indentation or opening being, in an active position, positioned below a level of said liquid, thereby allowing inflow of said liquid into said device, and said lower edge of said indentation or opening being, in an inactive position, positioned above the level of said liquid, thereby preventing inflow of said liquid into said device.

The outer member of the floater body is in direct contact with the surrounding liquid to be removed and is, in an embodiment, provided with indentations or openings for receiving a variable amount of said liquid, whereupon said liquid is conducted, via through-channels, into the suction chamber of the device. Since the floater body, and inferentially the device, thanks to presence of the indentations or openings, is not completely submerged during the process of liquid removal, the stability of the immersed device is improved in that the amplitude of the oscillations of the device between its active and inactive state is diminished. This contributes to an improved control of said process. Consequently, the accuracy of the device is preserved even in applications where a layer of bilge oil to be removed is rather thin.

In the same context, providing the floater body with through-channels enables for said liquid to be transferred in a controlled manner into the suction chamber of the device. The presence of said through-channels ensures that all of the received liquid is conveyed straight into the suction chamber. The undesirable entrapment of the received liquid by various parts of the device is hereby avoided. Thus, the through channels, in conjunction with the provision of above-mentioned openings or indentations, significantly improve the control of the process of liquid removal. As a consequence, the floater body floating on the liquid contained in the suction chamber may be accurately and stably positioned relative to the surrounding water and liquid. This is achieved without using additional structural components adapted to introduce forces acting on the device. Accordingly, fewer forces act on the device, reducing thereby significantly its operative complexity. As a consequence thereof, the number of components used as well as size of the device may be significantly reduced, permitting hereby its use in narrow spaces. Moreover, since fewer components are used, cleaning of the device is simplified and shortened.

Furthermore, the inherent design of the device, wherein the operational level of liquid held in the suction chamber is kept low, makes it very responsive to sudden changes of the level of liquid of the surrounding water and oil. This feature is especially useful on a wavy liquid surface. It is hereby ensured that all of the oil that has been guided into the suction chamber is held in said chamber and is, at all times, prevented from exiting the chamber, other than via the liquid outlet.

The at least one indentation or opening may have, at least partially, a substantially polygonal shape, such as rectangular, quadratic, trapezoidal or triangular, and/or a substantially rounded shape, such as circular, elliptic or parabolic, and/or a shape being substantially a mix of the aforementioned.

Preferably, each indentation or opening is positioned opposite a through channel. Hereby, entrapment of air between the outer member of the floater body and the inflowing stream of liquid is mitigated, as the air is able to evacuate along the outer member where it is not provided with openings or indentations and thus no inflowing stream of liquid exists. This ensures a fast and efficient inflow of liquid into the device.

According to a preferred embodiment, said floater body is entirely positioned in the interior of a circular cylinder, that extends perpendicularly to said surface of water, said cylinder being defined by a projection of a lowermost section of the flexible wall element onto a plane that is substantially parallel to said surface of water. This should be construed as said positioning of the floater body effectively shields said body from the detrimental buoyant forces exerted by the surrounding water and liquid. Improved stability of the entire device is hereby achieved. This is a result of the elimination of at least the buoyant force on the floater body, and inferentially on the device. Consequently, fewer forces act on the device as a whole, facilitating thereby its proper positioning relative the surrounding water and liquid, especially at high seas. This significantly improves the control of the process of liquid removal.

According to another embodiment, both the outer and the inner member of the floater body have substantially circular cross-sections that are parallel to the surface of water. The circular shape of the members' cross-sections facilitates their production and reduces the probability of undesirable liquid entrapment.

Any number of openings or indentations may be envisaged. According to another embodiment, said device comprises three uniformly circumferentially distributed indentations, at least one of them being shaped as an isosceles trapezoid, at a circumferential edge of the uppermost section of the outer member, and three uniformly circumferentially distributed through-channels, wherein each indentation is associated with one through-channel. This shape of the openings ensures an optimal inflow of the liquid to be removed into the suction chamber.

According to an embodiment, any outer transversal measurement of the bottom part is at least as large as the outer transversal measurement of the outer member. This assists in ensuring that the floater body is not affected by buoyancy forces from the surrounding water.

According to an embodiment of the device, any transversal measurement of the flexible wall element is at least as large as the outer transversal measurement of the outer member. This assists in ensuring that the floater body is not affected by buoyancy forces from the surrounding water.

According to an embodiment, the circumferentially extending flexible wall element is tapering from the bottom part towards the floater body. For instance, the general shape of the flexible wall is that of a frustum of a cone or frustum of a pyramid. This assists in ensuring that the floater body is not affected by buoyancy forces from the surrounding water.

According to another preferred embodiment, the outer member of the floater body has a circular cross section and said bottom part comprises a bottom surface and a annular collar, and said wall element is sealingly connected both to the outer cylindrical surface of said outer member and to the outer surface of the annular collar, and the outer diameter of said outer member is less than the outer diameter of said annular collar. In this way, a smooth vertical movement of the floater body is ensured. Advantageously, the stability, as well as compactness, of the entire device is improved.

According to another embodiment, the inner member of said floater body is provided with a central through-hole extending parallel to said direction of movement, and said liquid outlet is an evacuation conduit, preferably with a circular cross-section, that passes through at least said central through-hole. In this way, the floater body may be guided by said evacuation conduit while effectuating its vertical movement. This contributes to the improved stability of the entire device.

According to another preferred embodiment, play is provided between an inner wall that defines said central through-hole of said inner member and the evacuation conduit, and a one-way valve is arranged in said evacuation conduit. By providing said play, it may be avoided that the floater body gets stuck while effectuating its movement that is substantially perpendicular to the liquid level. The above is a common problem, when the evacuation conduit is used to evacuate the liquid. Said one-way valve allows flow of the liquid in one direction only. In this way, undesirable back flow of the liquid from the evacuation conduit into the suction chamber may be avoided. This improves the process of liquid removal.

According to another preferred embodiment, said evacuation conduit is coupled to a pump arranged for evacuating said liquid from the suction chamber. Alternatively, other liquid displacement means may be used.

According to another preferred embodiment, said device further comprises connecting means that connect the lower section of the evacuation conduit with a bottom plate of the bottom part, the inlet of the evacuation conduit preferably being positioned in or in near proximity of said lower section of the evacuation conduit. By fixedly attaching the lower section of the evacuation conduit to the bottom part a sturdy and robust structural design is achieved. As an advantage, a reliable operation of the device is achieved, a feature especially valuable in harsh operation environment. Placing the inlet of the evacuation conduit in or in near proximity of the lower section of the evacuation conduit ensures that the suction chamber can be completely or at least almost completely emptied of liquid by means of the evacuation conduit. This may be beneficial for instance in connection with cleaning, maintenance and the like.

According to another preferred embodiment, the ratio of the distance between the inner diameter of the evacuation conduit, and a lower edge of the evacuation conduit and the upper surface of the bottom plate, is at least 1. By way of an example, said diameter may be 15 mm and said distance is then 5 mm.

According to another preferred embodiment, said evacuation conduit is in fluid communication with an open end of a ship's suction hose, said suction hose being used for transfer of said liquid into the bilge water separator.

According to another preferred embodiment, said device comprises stabilizing means in the shape of a weight connected to the bottom part of the device and at least one at least partially submerged floating element, and preferably means for attaching said device to a ship. In this way, the device is made suitable for outdoor use, such as at open sea, where it collects oil that is result of the undesirable oil leakages from offshore oil-drilling platforms.

In an embodiment, the bottom part of the liquid removal device, in a condition of use, is connected to a fixed point. By the term "fixed point" is meant a point, which is fixed in relation to for instance the bottom of a bilge water tank, the seabed or the like, depending on the particular use of the device, i.e. a point, which does not follow the movements of the surface of the water in case of a wavy surface.

The fixed point may for instance be provided by the evacuation conduit or by the stabilizing means and the floating element. As the floater body causes the flexible wall element to extend or contract depending on the liquid level in the suction chamber, the bottom part being connected to a fixed point, such as the evacuation conduit, enables the floater body to be lifted out of the surrounding water, into which the device is at least partially submerged. This is particularly advantageous when the surface of water is wavy, as it mitigates the risk of flooding the device and enables it to substantially only remove liquid from the wave crests. This provides for an efficient liquid removal process even on a wavy water surface.

According to a second aspect, the invention relates to a method for removing a surface layer of liquid from water surface. The method allows, as has been discussed above in view of the device, for improved control of the liquid removal process from a water surface, while reducing the size of the device and a number of components used.

According to a preferred embodiment, the method further comprises the step of evacuating at least said liquid from a suction chamber in the interior of the device, via a liquid outlet. Said liquid may be evacuated into the bilge water separator, where oil may be separated from the water.

According to another preferred embodiment, the method further comprises the step of establishing an equilibrium between the amount of liquid received through said circumferential edge, indentation or opening and the amount of liquid evacuated from said suction chamber, such as to substantially immobilize said floater body. In this way a steady-state is achieved. Consequently, the electrical load on various components, such as a pump that drives the liquid evacuation process and to which the evacuation conduit may be coupled, becomes even. Advantageously, this reduces the wear of the pump, thus prolonging its useful life.

Other objectives, features and advantages of the present invention will appear from the following detailed disclosure, from the attached claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments, with reference to the appended drawings, where the same reference numerals will be used for similar elements, wherein:

FIG. 3 is a longitudinal section of the assembled device for removing a liquid, such as oil, from a water surface according to the first embodiment of the present invention, when the flexible wall element is fully stretched;

FIGS. 4a-4b show the floater body of the device of FIGS. 1-3 in different views;

DETAILED DESCRIPTION

Figure 1:
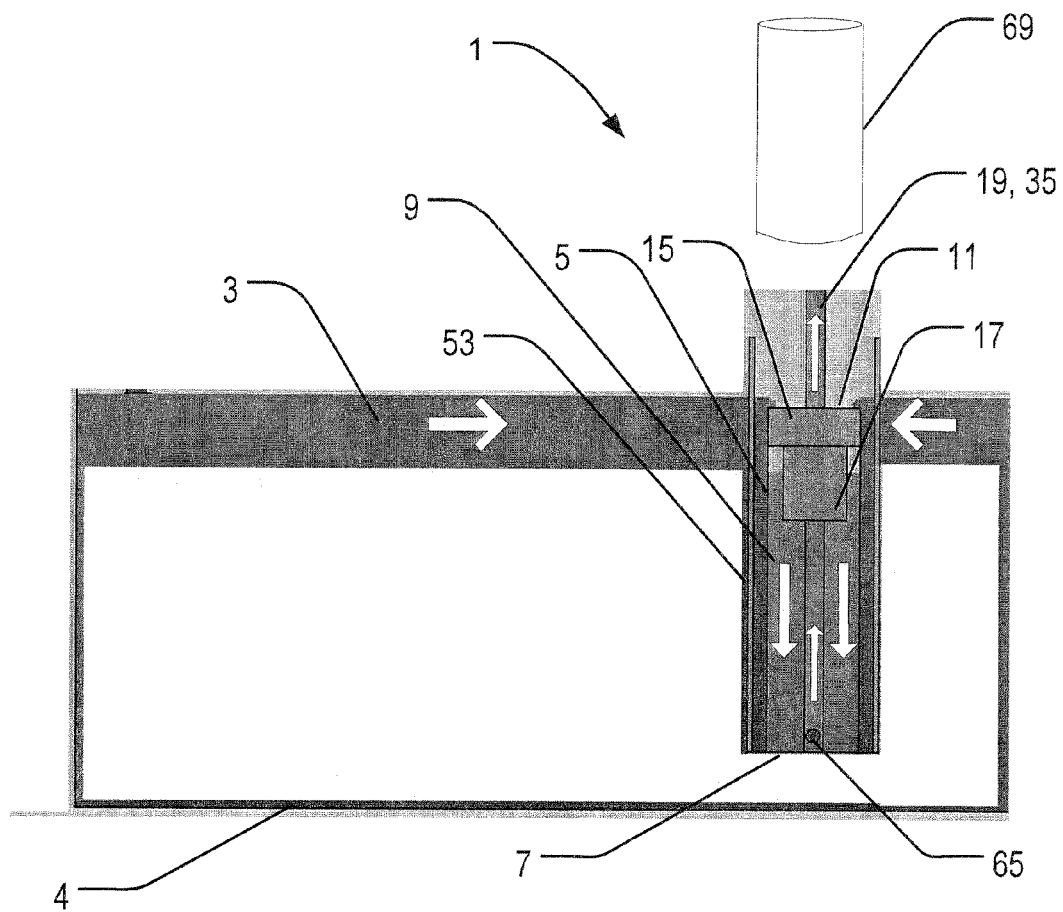
FIG. 1 is a longitudinal, highly schematical section of an immersed device for removing a liquid such as oil from a water surface according to a first embodiment of the present invention.

FIG. 1 is a longitudinal (i.e. vertical), highly schematical section of an immersed device 1 for removing a liquid 3 such as oil from a water surface according to a first embodiment of the present invention. In this embodiment, the device 1 is positioned in a bilge tank 4 of a ship (not shown in FIG. 1). However, the device 1 according to this embodiment may also be used for other purposes, such as for removing oil from the water surface in dock areas.

Said device comprises a vertically movable floater body 11. A flexible wall element 5 is, at its upper end, sealingly connected, preferably by means of a tight fit, to the floater body 11 and is, at its lower end, sealingly connected, preferably strapped, to a bottom part 7.

Said floater body 11 is entirely positioned in the interior of a circular cylinder 69, that extends perpendicularly to said surface of water, said cylinder being defined by a projection of a lowermost portion of the flexible wall element 5 onto a plane that is substantially parallel to said surface of water. Even though present in the depicted embodiment, embodiments of the device without the cylinder 69 may be envisaged.

The floater body 11 comprises an outer, cylindrically shaped member 15 and a coaxial, thereto connected, cylindrically shaped inner member 17.

An evacuation conduit 35 is coupled to a pump (not shown in FIG. 1). Said evacuation conduit 35 serves as liquid outlet 19 in the first embodiment of the present invention, but the liquid outlet may be carried out in various ways, one of which is described in conjunction with FIG. 5. The device 1 has a suction chamber 9 of variable size delimited by a bottom surface of the floater body 11, the wall element 5 and the bottom part 7. At least one suction hole 65 that falls into the suction chamber 9 is provided at a first end of the evacuation conduit 35.

The device 1 is surrounded by a cage-like structure 53 that prevents clogging of the device 1. Said cage-like structure 53 is positioned close to the flexible wall element 5. It doesn't impede the inflow of the liquid to be removed into the device 1. The parts of said device will be more thoroughly described in conjunction with FIGS. 2-4.

Figure 2:
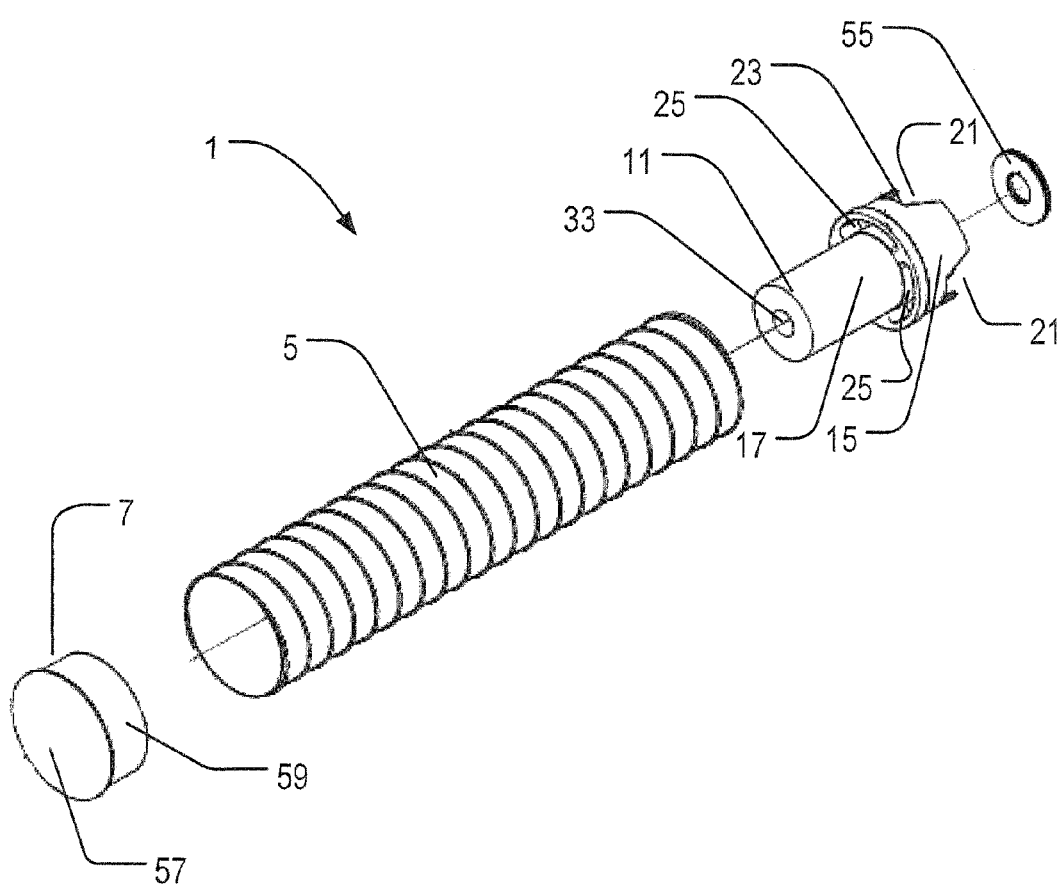
FIG. 2 is an exploded view of the device according to the first embodiment of the present invention.
Figure 6:
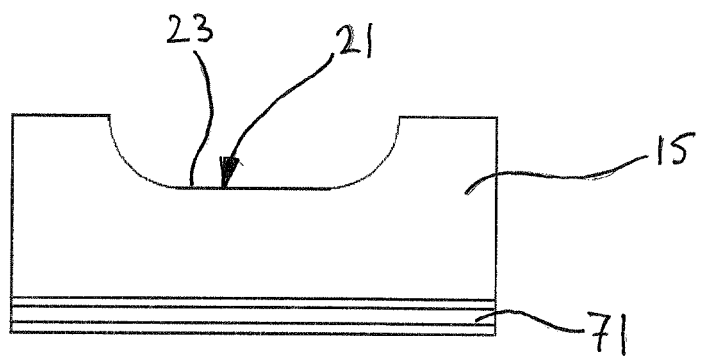
FIGS. 6, 7 and 8 are schematical views of different shapes of indentations at the upper circumferential edge of the outer member according to respective embodiments of the present invention.
Figure 7:
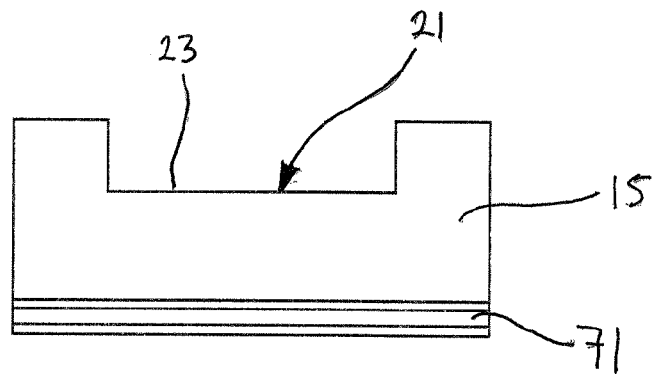
Figure 8:
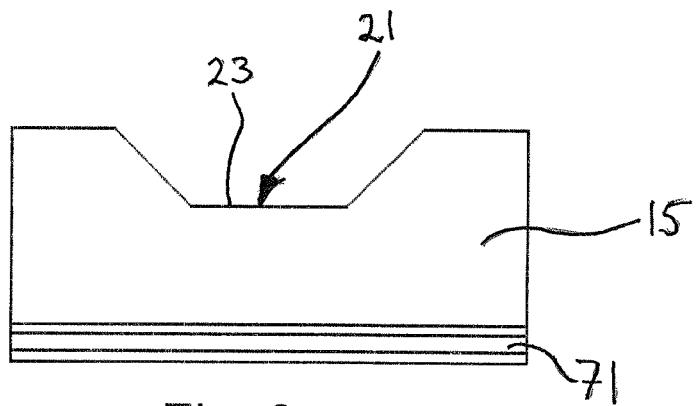
Figure 9:
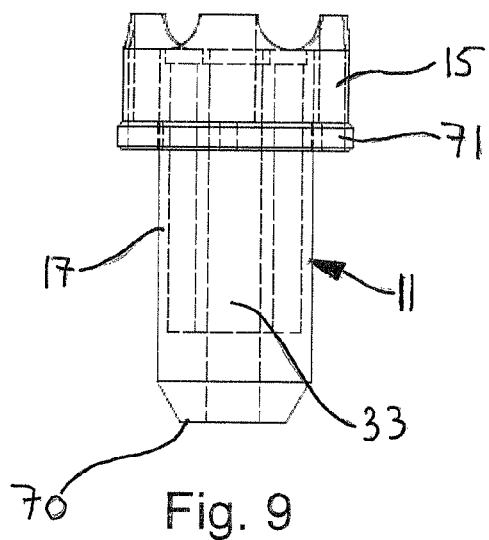
FIGS. 9-12 show different schematical views of the floater body of another embodiment of the device.
Figure 11:
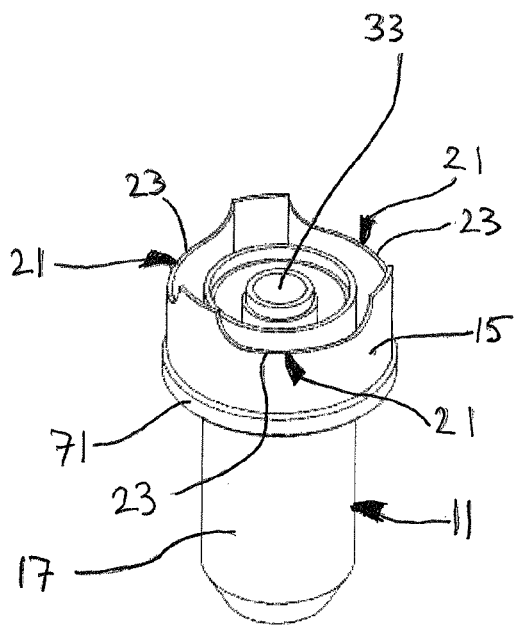
Figure 10:
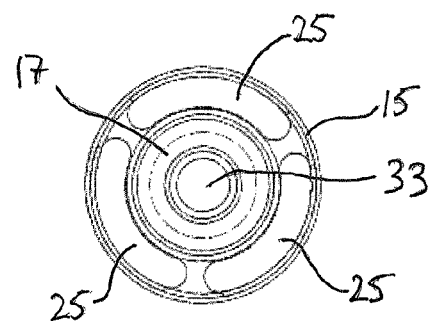
Figure 12:
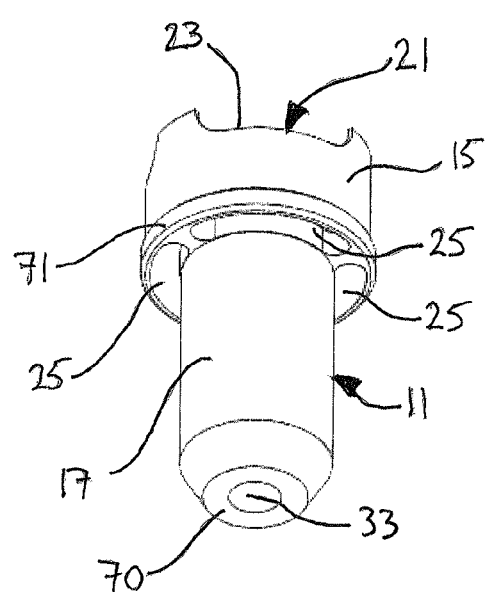

FIG. 2 is an exploded view of the device 1 in FIG. 1. It illustrates an order of assembly of various parts of the first embodiment of the present invention. The outer member 15 of the floater body 11 is at its upper circumferential edge provided with a plurality of openings 21 for receiving the liquid. Openings 21 are shaped as isosceles trapezoids seen in cross-section. Said trapezoidal openings 21 have one basis that is 50 mm long at the upper edge of the outer member 15 and a thereto parallel basis that is 20 mm long. Legs of the trapezoidal openings 21 are 30 mm long. Openings 21 having other shapes and dimensions, such as for instance those indicated on FIGS. 6, 7 and 8, may be conceived, as is other numbers of openings, for instance 4, 5 or 6 openings. A plurality of through-channels 25, each of which is associated with one of the above mentioned openings 21, extends between the outer 15 and inner 17 members.

The floater body 11 further comprises a disk-shaped top part 55 that prevents oil and/or water from entering the interior of the inner member 17, typically made in polymer material, and a central axial through-hole 33 that both accommodate an evacuation conduit. The top part 55 is sealingly connected to a portion of the top surface of the floater body 11.

The floater body 11 is normally made in polymer material such as polypropylene. Furthermore, an essentially tubular wall element 5 that comprises polymer hose, preferably made in PVC that is suspended by a spiral-shaped non-corrosive, preferably metallic, wire may be seen.

Another embodiment of the floater body 11 having differently shaped indentations 21 is seen in FIGS. 9-12. Also, the inner member 17 tapers towards a bottom face 70 in order to reduce the risk of the floater body 11 getting stuck during use. The floater body of any embodiment of the device may taper towards the bottom face.

A bottom part 7 that comprises a metallic bottom plate 57 and a thereto welded annular metallic collar 59, both made in a material that can withstand harsh environment, such as stainless steel, are also shown in FIGS. 2 and 3. The bottom face 70 of the inner member 17 of the floater body abuts the bottom plate 57 in a fully contracted state of the wall element 5.

A circumferential protrusion 71 is provided on the outer member 15. Mounting the wall element 5 on the circumferential protrusion 71 prevents buoyancy forces from the surrounding water from acting on the floater body.

In the following, use of the device 1 according to FIGS. 1 and 2 will be explained. Prior to start of the operation of the device 1, its evacuation conduit 35 is suitably connected, for instance press-fitted or threaded onto, a suction hose (not shown) leading to a bilge water separator (not shown) found onboard ships, establishing thereby fluid communication between the suction chamber 9 and the separator. Subsequently, the device 1 is immersed in the liquids present in the bilge tank 4, wherein a layer of oil typically floats on top of water. Initially, the suction chamber 9 is completely filled with liquid 3, i.e. oil and/or water, enabling thereby floating of the therein immersed floater body 11. The floater body 11 is then at its uppermost position and the flexible wall element 5 is maximally stretched. Consequently, the amplitude of the movement of the floater body 11 is effectively limited by the wall element 5. Since the lower edge 23 of the respective opening 21 thereby is positioned above the oil level, the oil floating on the surface of the water cannot flow into the suction chamber 9. The pump is thereafter started and evacuation of the liquid from the suction chamber 9 commences, causing the level of liquid in the chamber 9 to fall. Since the floater body 11 is immersed in said liquid, it moves downwards as the level of liquid decreases. From the moment when the lower edge 23 of the respective opening 21 provided in the outer member 15 of the downwards moving floater body 11 is aligned with the oil level, the skimming of oil starts, whereby oil is received by the respective openings 21 and via the through-channels 25 guided into the suction chamber 9. Flow directions are indicated by arrows in FIG. 1. Said flexible wall element 5 contracts as the level of liquid in the suction chamber 9 decreases since said element is sealingly connected to the outer member 15. After a while, when the appropriate portion of the oil-receiving openings 21 is exposed to the surrounding oil to be skimmed, a steady state is reached, wherein the amount of oil per time unit that is pumped out of the device 1 equals the amount of skimmed oil per time unit. During operation the bottom part 7 of the device is substantially stationary, it may even be positioned to rest on the bottom of the bilge tank 4. It is to be understood that the device according to the first embodiment of the invention may be used to remove oil in all spaces onboard a ship, as the presence of a floating oil layer is a significant inconvenience for the working environment of the crew.

In case of rough sea, the first time a wave floods the device 1, the suction chamber 9 is completely filled with the mix of liquid 3 and water that constitutes the wave. As the bottom part 7 of the device 1 is fixed at a certain level in relation to the bottom of the tank 4 by means of the evacuation conduit 35, the flooding of the device brings the floater body 11 to its uppermost position and the flexible wall element 5 to its maximally stretched state. In this position, the lower edge 23 of the openings 21 are positioned above the oil level at wave troughs but substantially at the oil level at wave crests. Hereby subsequent flooding of the device with a mix of liquid and water is mitigated, and an efficient skimming of the oil is obtained even on a wavy surface of the water.

FIG. 3 is a longitudinal section of an assembled device 1 for removing a liquid such as oil from a water surface according to the first embodiment of the present invention, when the flexible wall element 5 is fully stretched. A thorough description of the operation of said device 1 is made in conjunction with FIGS. 1 and 2, to which reference is made. In addition to what has been previously mentioned, a play 37 is provided between an inner wall of the inner member 17, said wall being defining the central axial through-hole, and the evacuation conduit 35. Said play 37 ensures smooth vertical movement of the device 1. Furthermore, a one-way valve (not shown) may be arranged in the evacuation conduit 35. Its purpose is to allow only outwards flow of the oil in the conduit. Moreover, the evacuation conduit 35 is fixedly attached to the bottom part 7 by means of a plurality of brackets 43. Typically, the ratio of the distance between the inner diameter of the evacuation conduit 35, and a lower edge 45 of the evacuation conduit 35 and the upper surface 57 of the bottom plate 7, is at least 1. By way of an example, said diameter may be 15 mm and said distance is then 5 mm.

In addition, the outer diameter of the outer member 17 is less than the outer diameter of the annular collar 59. In this way, a smooth vertical movement of the floater body 11 is ensured since the risk of entangling of the flexible wall element 5 is eliminated. Furthermore, the above-mentioned relationships between the outer diameters of the outer member 15 and the annular collar 59 and the dimensions of the flexible wall element 5 improve the stability of the entire device 1.

FIGS. 4a-4b show the floater body 11 of the device 1 of FIGS. 1-3 in different views. The floater body 11, whose radial cross-section is shown in FIG. 4a, will be described in more detail in conjunction with FIG. 4b, wherein its longitudinal section is shown. In addition to what has been previously mentioned, the inner member 17 is hollow for the most part. Said hollow section may be filled with suitably shaped objects in a material of choice in order to adapt the density of the entire floater body 11 to the varying external conditions, such as temperature, as well as different fields of application. As may be seen, the central axial through-hole 33 is defined by an inner wall 39 of the inner member 17. The lowermost part of the inner member is massive. The purpose of said massive part is to extend the operating range of the floater body 11 in the downwards direction, when the liquid level in the suction chamber 9 is low. The presence of the massive part stabilizes the floater body 11, thus preventing the highly probable negative impact of the almost fully contracted wall element 5 on the floater body 11. As it may be clearly seen, a lowermost part of the outer member 15 protrudes slightly in a radial direction in order to facilitate the tightly-fitting, sealing connection of the flexible wall element (not shown in FIG. 4b) with the outer member 15.

Figure 5:
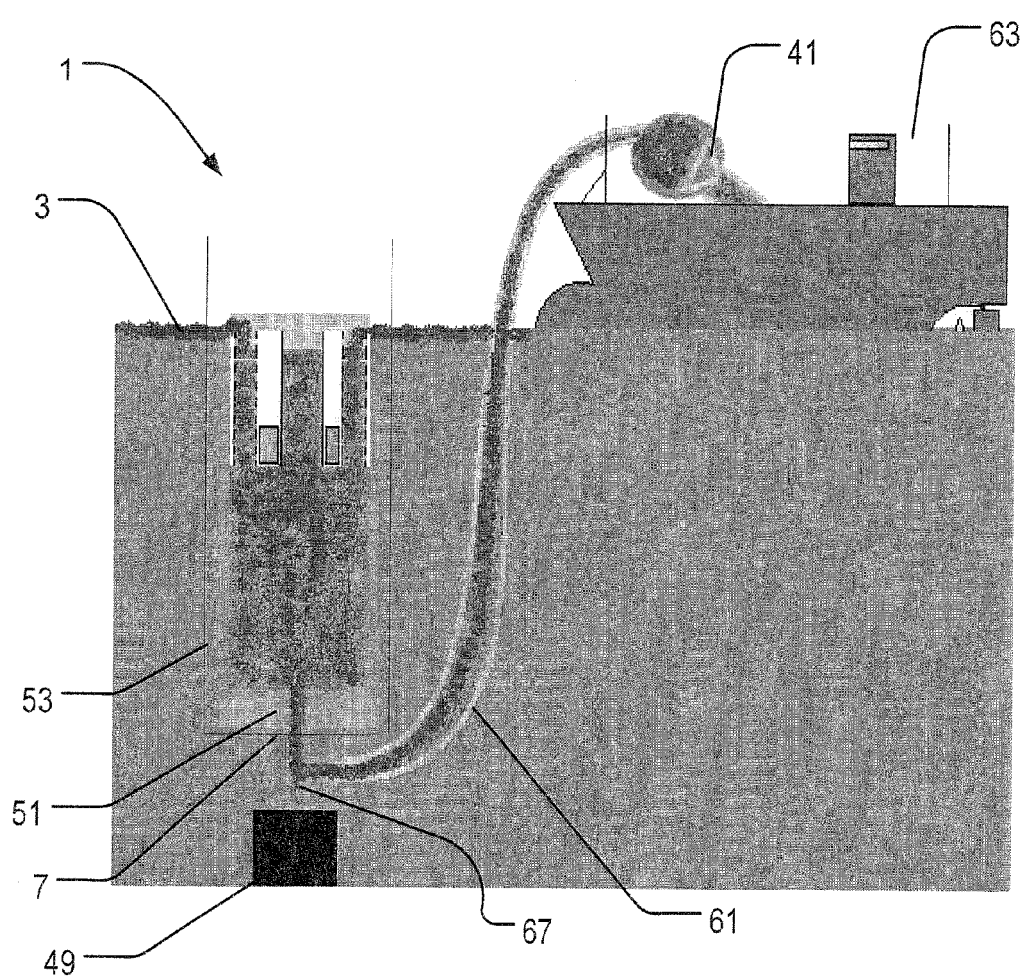
FIG. 5 is a highly schematical perspective view of a partially immersed device for removing a liquid from a water surface according to another embodiment of the present invention.

FIG. 5 is a highly schematical, perspective view of a partially immersed device 1 for removing a liquid from a water surface according to another embodiment of the present invention.

In this embodiment, the device 1 is to be used at open sea for skimming oil 3 from the sea water surface, for instance in order to avoid environmental damage. For that reason, the device 1 of this embodiment is much larger than the one described in previous embodiments. The same general concept as previously described is employed. Reference is therefore made to the explanation made in conjunction with FIGS. 1 and 2 for a thorough description of the operation of said device 1. Unlike in the previous embodiment, the oil is evacuated from an interior of the device 1 via an oil suction pipe 61 provided in a bottom part 7 of the device 1. An annular, submerged element 51 having low weight and significant volume (thereby improving floating properties of the device) is arranged in abutting engagement with the lower surface of the bottom part 7. A weight 49, submerged in sea water and attached to the device 1 by means of a connecting rod 67, is provided below said bottom part 7. The weight 49 provides additional stability to the device 1 by restricting its lateral movements, especially during hard weather. As it may be seen, said oil suction pipe 61 is partially integrated in the connecting rod 67, and said pipe 61 also connects the device 1 to a ship 63. As an alternative, a dedicated connecting beam (not shown) may be conceived. A pump 41 is located onboard the ship 63 ensuring that the skimmed oil is evacuated into a suitable apparatus, e.g. a water-oil separator (not shown) that is normally also located onboard the ship 63. The device 1 is surrounded by a cage-like structure 53 that prevents floating foreign objects, such as dead birds and animals, from clogging the openings and/or the through-channels of the device 1. In this way, the availability of the device 1 is maintained.

Figure 13:
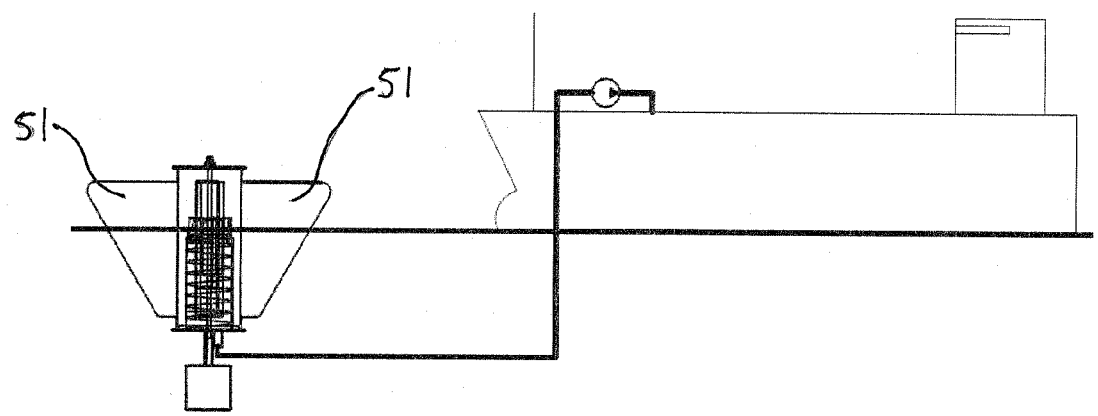
FIG. 13 show a highly schematical view of a partially immersed device for removing a liquid from a water surface according to another embodiment of the present invention.

Alternatively, floating elements 51 evenly distributed along the circumference and shaped as those schematically depicted on FIG. 13, are provided. As they extend along the length of the flexible wall element, improved stability is provided.

As an alternative, an embodiment comprising a suitably sized storage tank for the skimmed oil that is integrated with the suction chamber, or that is in fluid communication with said chamber may be conceived. It is also conceivable to use the mass of the storage tank with a therein contained liquid to act as the above-mentioned weight. In this embodiment, the emptying of the tank is not done continuously. Instead, the tank is emptied once the device reaches a harbour or a properly equipped vessel.

Although the use of the device according to the invention for the removal of liquid such as oil from the water surface has been repeatedly discussed in conjunction with the present invention, it is to be understood that use of the device according to one of the embodiments of the present invention in connection with liquids other than water and oil, respectively, is equally conceivable. By way of example, in beach areas where water often is shallow, a slurry-like liquid having significant concentration of algae may be seen floating on the water surface, requiring the employment of the device. Furthermore, it is conceivable to employ the device according to the invention in other industries, such as in dairies and in breweries, in order to skim a surface of a liquid.

The invention has mainly been described above with reference to a few embodiments. However, as will be readily appreciated by a person skilled in the art, other embodiments than the ones disclosed above are equally possible within the scope of the invention, as defined by the appended patent claims.

In the following, a number of further general embodiments and examples are described.

a. A liquid removal device (1) for removing a liquid (3), such as oil or an algae slurry, from a surface of water, said device (1) comprising: a circumferentially extending flexible wall element (5) defining together with a bottom part (7) a suction chamber (9) for receiving said liquid (2), said wall element (5) being adapted to be immersed in said water, a floater body (11) being sealingly connected to said wall element (5) at an upper edge of the latter, and being adapted to be at least partially submerged in said liquid and being able to effectuate a movement, in a direction that is substantially perpendicular to said surface of water, said floater body (11) having a circumferentially extending outer member (15) and an inner member (17), which is coaxial with the outer member and connected thereto, said inner member (17) being adapted to receive a buoyant force exerted by said liquid (3) contained in the suction chamber (9), and a liquid outlet (19) for said liquid (3) from said suction chamber (9), said outlet (19) being in fluid communication with said suction chamber (9), wherein said outer member (15), in or at an upper circumferential edge, has at least one indentation or opening (21) for receiving said liquid (3), a lower edge (23) of said indentation or opening (21) being, in an active position, positioned below the level of said liquid (3) in said tank (4), thereby allowing inflow of said liquid (3) into said device (1), and said lower edge (23) of said indentation or opening (21) being, in an inactive position, positioned above a level of said liquid (3) in said tank (4), thereby preventing inflow of said liquid into said device (1), wherein at least one through-channel (25) extends between said outer (15) and inner (17) members and allows the liquid being received by said indentation or opening (21) to flow therefrom into said suction chamber (9), and wherein said movement of said floater body (11) is enabled, as a function of the amount of said liquid in the suction chamber (9), between the active and the inactive position.

b. The floater body (11) is entirely positioned in the interior of a circular cylinder (69), that extends perpendicularly to said surface of water, said cylinder (69) being defined by a projection of a lowermost section of the flexible wall element (5) onto a plane that is substantially parallel to said surface of water.

c. Both the outer (15) and the inner member (17) of the floater body (11) have substantially circular cross-sections that are substantially parallel to the surface of water.

d. Device (1) includes three uniformly circumferentially distributed indentations (21), at least one of them being shaped as an isosceles trapezoid, at a circumferential edge of the uppermost section of the outer member (15) and three uniformly circumferentially distributed through-channels (25), wherein each indentation (21) is associated with one through-channel (25).

e. The outer member (15) of the floater body (11) has a circular cross section and said bottom part (7) comprises a bottom surface (57) and an annular collar (59), and said wall element (5) is sealingly connected both to the outer cylindrical surface of said outer member (15) and to the outer surface of the annular collar (31), and the outer diameter of said outer member (15) is less than the outer diameter of said annular collar (31).

f. Inner member (17) of said floater body (11) is provided with a central through-hole (33) extending parallel to said direction of movement, and said liquid outlet is an evacuation conduit (35), preferably with a circular cross-section, that passes through at least said central through-hole (33).

g. Play (37) is provided between an inner wall (39) that defines said central through-hole (33) of said inner member (17) and the evacuation conduit (35), and a one-way valve is arranged in said evacuation conduit (35).

h. The evacuation conduit (35) is coupled to a pump (41) arranged for evacuating said liquid from the suction chamber (9).

i. The device (1) further comprises connecting means (43) that connect a lower section of the evacuation conduit (35) with a bottom plate (57) of the bottom part (7).

j. The ratio of the distance between the inner diameter of the evacuation conduit, and a lower edge (45) of the evacuation conduit (35) and the upper surface of the bottom plate (57) is at least 1.

k. The evacuation conduit (35) is in fluid communication with an open end of a ship's suction hose (47), said suction hose (47) being used for transfer of said liquid into a bilge water separator.

l. The device (1) further comprises stabilizing means (49) in the shape of a weight connected to a bottom part (7) of the device (1) and positioned below said bottom part (7), at least one at least partially submerged floating element (51) and means for attaching said device (1) to a ship (63).

m. A method for removing a liquid (3) such as oil or an algae slurry from a water surface, said method comprising the steps of:

providing a device (1) comprising a circumferentially extending flexible wall element (5) defining together with a bottom part (7) a suction chamber (9) for receiving said liquid, said wall element (5) being adapted to be immersed in said water, a floater body (11) being sealingly connected to said wall element (5) at an upper edge of the latter, and being adapted to be at least partially submerged in said liquid, said floater body (11) having a circumferentially extending outer member (15) and an inner member (17), which is coaxial with the outer member and connected thereto, said inner member (17) being adapted to receive a buoyant force exerted by said liquid contained in the suction chamber (9), and a liquid outlet (19) for said liquid from said suction chamber (9), said outlet (19) being in fluid communication with said suction chamber (9), said outer member (15), in or at an upper circumferential edge, having at least one indentation or opening (21) for receiving said liquid, and at least one through-channel (25) extending between said outer (15) and inner members (17) and allowing the liquid being received by said indentation or opening (21) to flow therefrom into said suction chamber (9), positioning said device (1) such that it is at least partially immersed in at least one of said liquid and water, so that a lower edge (23) of said indentation or opening (21) is positioned below a level of said liquid (3), allowing thereby inflow of said liquid via the through-channels (25) of the device (1) and into said suction chamber (9), so that said floater body (11), as a function of a magnitude of a buoyant force exerted by said received liquid on said inner member (17), moves in a direction that is substantially perpendicular to said surface of water, such as to control the amount of liquid received through said indentation or opening (21).

n. The method further includes evacuating said liquid from a suction chamber (9) in the interior of the device (1), via a liquid outlet (19).

o. The method further includes establishing an equilibrium between the amount of liquid received through said indentation or opening (21) and the amount of liquid evacuated from said suction chamber (9), such as to substantially immobilize said floater body (11).

The invention claimed is:

1. A liquid removal device for removing a liquid, such as oil or an algae slurry, from a surface of water, said device comprising:

a circumferentially extending flexible wall element defining together with a bottom part a suction chamber for receiving said liquid, said flexible wall element being adapted to be immersed in said water, a floater body being sealingly connected to said flexible wall element at an upper edge of the latter, and being adapted to be at least partially submerged in said liquid and being able to effectuate a movement in a direction that is substantially perpendicular to said surface of water, said floater body having a circumferentially extending outer member and an inner member, which is coaxial with the outer member and connected thereto, said inner member being adapted to receive a buoyant force exerted by said liquid contained in the suction chamber, and a liquid outlet for evacuating said liquid from said suction chamber, said outlet being in fluid communication with said suction chamber, wherein said outer member has an upper circumferential edge for receiving said liquid, the edge being, in an active position, positioned below a level of said liquid, thereby allowing inflow of said liquid into said device, and said edge being, in an inactive position, positioned above the level of said liquid, thereby preventing inflow of said liquid into said device, a plurality of through channels extend between said outer and inner members and allows the liquid being received by said circumferential edge to flow therefrom into said suction chamber, and said movement of said floater body is enabled, as a function of the amount of said liquid in the suction chamber, between the active and the inactive position, wherein the flexible wall element has a maximum length in a fully extended state of the flexible wall element and a minimum length in a fully contracted state of the flexible wall element, and wherein a difference between the maximum length of the flexible wall element and the minimum length of the flexible wall element is at least 2 times a largest diameter of the flexible wall element, wherein the outer member of the floater body at an upper circumferential edge thereof includes a plurality of indentations or openings configured to receive the liquid, and wherein each one of the plurality of through-channels respectively corresponds to a single one of the plurality of indentation or openings.

2. A device according to claim 1, wherein the difference in length of the flexible wall element in a fully extended state and in a fully contracted state, respectively, is at least 4 times any transverse measurement of the flexible wall element.

3. A device according to claim 1, wherein the difference in length of the flexible wall element in a fully extended state and in a fully contracted state, respectively, is at least 6 times any transverse measurement of the flexible wall element.

4. A device according to claim 1, wherein the difference in length of the flexible wall element in a fully extended state and in a fully contracted state, respectively, is at least 8 times any transverse measurement of the flexible wall element.

5. A device according to claim 1, wherein the length of the flexible wall element in its fully contracted state is at least as large as any transverse measurement of the flexible wall element.

6. A device according to claim 1, wherein the length of the flexible wall element in its fully contracted state is at least 2 times any transverse measurement of the flexible wall element.

7. A device according to claim 1, wherein the length of the flexible wall element in its fully contracted state is at least 3 times any transverse measurement of the flexible wall element.

8. A device according to claim 1, wherein the length of the flexible wall element in its fully contracted state is at least 4 times any transverse measurement of the flexible wall element.

9. A device according to claim 1, wherein the difference in length of the flexible wall element in a fully extended state and in a fully contracted state, respectively, is at least 2 times the length of the flexible wall element in its fully contracted state.

10. A device according to claim 1, wherein the difference in length of the flexible wall element in a fully extended state and in a fully contracted state, respectively, is at least 3 times the length of the flexible wall element in its fully contracted state.

11. A device according to claim 1, wherein the difference in length of the flexible wall element in a fully extended state and in a fully contracted state, respectively, is at least 4 times the length of the flexible wall element in its fully contracted state.

12. A device according to claim 1, wherein said inner member of said floater body is provided with a central through-hole extending parallel to said direction of movement, and said liquid outlet is an evacuation conduit that passes through at least said central through-hole.

13. A device according to claim 12, wherein said device further comprises connecting means that connect a lower section of the evacuation conduit with a bottom plate of the bottom part.

14. The device of claim 13, wherein the inlet of the evacuation conduit is in or in near proximity to the lower section of the evacuation conduit.

15. The device of claim 12, wherein the liquid outlet is an evacuation conduit with a circular cross-section that passes through at least the central through-hole.

16. A device according to claim 1, wherein said device comprises stabilizing means in the shape of a weight connected to the bottom part of the device and at least one at least partially submerged floating element.

17. The device of claim 16, further comprising means for attaching the device to a ship.

18. A device according to claim 1, wherein the bottom part of the liquid removal device, in a condition of use, is connected to a fixed point.

19. A device according to claim 18, wherein the fixed point is provided by an evacuation conduit.

20. A device according to claim 18, wherein the fixed point is provided by stabilizing means and a floating element.

21. A device according to claim 1, wherein each said indentation or opening for receiving said liquid has a lower edge of said indentation or opening being, in an active position, positioned below a level of said liquid, thereby allowing inflow of said liquid into said device, and said lower edge of said indentation or opening being, in an inactive position, positioned above the level of said liquid, thereby preventing inflow of said liquid into said device.

22. A device according to claim 21, wherein said indentations or openings have, at least partially, a substantially polygonal shape including a rectangular, quadratic, trapezoidal or triangular shape, a substantially rounded shape including a circular, elliptic or parabolic shape, and/or a shape being substantially a mix of the aforementioned.

23. A device according to claim 21, wherein said openings or indentations are positioned directly opposite the plurality of through-channels.

24. A device according to claim 1, wherein any outer transversal measurement of the bottom part is at least as large as the outer transversal measurement of the outer member.

25. A device according to claim 24, wherein the circumferentially extending flexible wall element is tapering from the bottom part towards the floater body.

26. A device according to claim 1, wherein any transversal measurement of the flexible wall element is at least as large as the outer transversal measurement of the outer member.

27. A method for removing a liquid such as oil or an algae slurry from a water surface, said method comprising the steps of:
providing a device according to claim 1,
positioning said device such that it is at least partially immersed in at least one of said liquid and water, so that the circumferential edge of said outer member, or the lower edge of the indentation or opening, is positioned below a level of said liquid, allowing thereby inflow of said liquid via the plurality of through-channels of the device and into said suction chamber, so that said floater body, as a function of a magnitude of a buoyant force exerted by said received liquid on said inner member, moves in a direction that is substantially perpendicular to said surface of water, such as to control the amount of liquid received through said circumferential edge or indentation or opening.

28. A method according to claim 27, said method further comprising the step of evacuating said liquid from the suction chamber via a liquid outlet and establishing an equilibrium between the amount of liquid received through said circumferential edge and the amount of liquid evacuated from said suction chamber, such as to substantially immobilize said floater body.

29. The device of claim 1, further comprising a cage-like structure configured to prevent clogging of the device; wherein
the cage-like structure surrounds the device; and
the cage-like structure is configured to allow the inflow of the liquid into the device.

* * * * *